US011768703B2

(12) United States Patent
Wang

(10) Patent No.: US 11,768,703 B2
(45) Date of Patent: Sep. 26, 2023

(54) GPU-SHARED DISPATCHING AND SINGLE-MACHINE MULTI-CARD METHODS, SYSTEMS, AND DEVICES

(71) Applicant: Inspur Suzhou Intelligent Technology Co., Ltd., Suzhou (CN)

(72) Inventor: Dekui Wang, Suzhou (CN)

(73) Assignee: INSPUR SUZHOU INTELLIGENT TECHNOLOGY CO., LTD., Suzhou (CN)

(*) Notice: Subject to any disclaimer, the term of this patent is extended or adjusted under 35 U.S.C. 154(b) by 0 days.

(21) Appl. No.: 17/917,860

(22) PCT Filed: Jan. 26, 2021

(86) PCT No.: PCT/CN2021/073784
§ 371 (c)(1),
(2) Date: Oct. 7, 2022

(87) PCT Pub. No.: WO2021/203805
PCT Pub. Date: Oct. 14, 2021

(65) Prior Publication Data
US 2023/0153151 A1 May 18, 2023

(30) Foreign Application Priority Data
Apr. 8, 2020 (CN) .......................... 202010277708.7

(51) Int. Cl.
*G06F 9/48* (2006.01)
*G06F 9/38* (2018.01)
(52) U.S. Cl.
CPC .......... *G06F 9/4881* (2013.01); *G06F 9/3877* (2013.01)
(58) Field of Classification Search
CPC ...................... G06F 9/4881; G06F 9/3877
See application file for complete search history.

(56) References Cited

U.S. PATENT DOCUMENTS

2018/0052709 A1    2/2018  Fong et al.
2021/0141655 A1*   5/2021  Gamage .............. G06F 9/45545

FOREIGN PATENT DOCUMENTS

CN    109067828 A    12/2018
CN    109885389 A     6/2019
(Continued)

OTHER PUBLICATIONS

International Search Report and Written Opinion of corresponding PCT application PCT/CN2021/073784 dated Apr. 1, 2021 inlcuding English translation (14 pages).
(Continued)

*Primary Examiner* — Wissam Rashid
(74) *Attorney, Agent, or Firm* — Crowell & Moring LLP

(57) ABSTRACT

The present application discloses Graphics Processing Unit (GPU)-shared dispatching and single-machine multi-card methods, systems, and devices, applied to a dispatcher of a central control host. In the present application, a resource occupation marker and an update marker are added to a pod, the resource occupation marker is used to prove that the pod is running, and the update marker is used to indicate that resource usage information in an annotation of the pod is consistent with actual resource usage information, whereby during dispatching, a resource usage situation of each pod may be determined. The resource usage information, i.e., GPU information of an actually used GPU, in the annotation of the pod is updated before dispatching, to ensure that the GPU information in the annotation is consistent with GPU information actually recorded in an environment variable of the pod.

20 Claims, 6 Drawing Sheets

(56) References Cited

FOREIGN PATENT DOCUMENTS

| CN | 110457135 A | 11/2019 |
|---|---|---|
| CN | 110888743 A | 3/2020 |
| CN | 110930291 A | 3/2020 |
| CN | 111475303 A | 7/2020 |

OTHER PUBLICATIONS

"Search report of corresponding CN priority application (CN202010277708.7) dated Aug. 16, 2022" (1 page).
"Notification to Grant Patent Right for Invention of corresponding CN priority application (CN202010277708.7) dated Aug. 25, 2022", including English translation (2 pages).

\* cited by examiner

GPU-SHARED DISPATCHING AND SINGLE-MACHINE MULTI-CARD METHODS, SYSTEMS, AND DEVICES

This application is the national phase application of International Patent Application No. PCT/CN2021/073784, filed Jan. 26, 2021, which claims priority to Chinese Patent Application No. 202010277708.7, filed on Apr. 8, 2020, in China National Intellectual Property Administration and entitled "GPU-Shared Dispatching and Single-Machine Multi-Card Methods, Systems, and Devices", the contents of each of which are hereby incorporated by reference in their entirety.

FIELD

The present disclosure relates to the field of computer resource management, and particularly to Graphics Processing Unit (GPU)-shared dispatching and single-machine multi-card methods, systems, and devices.

BACKGROUND

When a user enables a pod (minimum management element in Kubernetes) as a development platform on the Kubernetes (K8s), resource requirements of enabling this pod also need to involve GPUs because GPUs are also needed by development. If fine-grained GPU segmentation is not performed, at least one GPU is used, resulting in tremendous resource waste. Considering a scenario of GPU development by a plurality of users, generally speaking, utilization of the GPU by each user is low (contrary to a training task) during development, and thus it is necessary to share the GPU by the users before.

In the prior art, fine-grained dispatching of Kubernetes clusters may be supported, but only single-machine single-card dispatching is supported. That is, a Universally Unique Identifier (UUID) of only one GPU may be written to environment variables of all containers of a pod, and there is a certain bug. When a dispatcher dispatches the pod, a resource used by the pod may be inconsistent with an actually used resource, which is prone to a dispatching failure.

Therefore, a GPU-shared dispatching method supporting single-machine multi-card dispatching is needed.

SUMMARY

In view of this, an objective of the present disclosure is to provide GPU-shared dispatching and single-machine multi-card methods, systems, and devices. A resource usage situation of a pod may be determined before dispatching, and single-machine multi-card dispatching is supported. Solutions are as follows.

A GPU-shared dispatching method is provided, applied to a dispatcher of a central control host and including:

querying GPU information in an environment variable of a non-updated pod in each controlled host by use of a resource occupation marker and an update marker of a pod, the non-updated pod being a pod that is already running but yet does not update the GPU information;

updating the GPU information to the non-updated pod, and adding an update marker for the non-updated pod;

screening out a dispatchable controlled host without an unmarked pod from a plurality of controlled hosts, the unmarked pod being a pod without an update marker;

screening out, by use of state information of a GPU in the dispatchable controlled host, a target controlled host satisfying a first preset condition from the dispatchable controlled host and a target GPU satisfying a second preset condition in the target controlled host;

writing GPU information of the target GPU a pod to be allocated; and allocating the pod to be allocated to the target controlled host.

In some embodiments, a process of querying the GPU information in the environment variable of the non-updated pod in each controlled host by use of the resource occupation marker and the update marker of the pod includes:

querying a container Identity (ID) of the non-updated pod in each controlled host by use of the resource occupation marker and the update marker of the pods; and querying the GPU information in the environment variable of the non-updated pod by use of the container ID of the non-updated pod.

In some embodiments, a process of screening out, by use of the state information of the GPU in the dispatchable controlled host, the target controlled host satisfying the first preset condition in the dispatchable controlled host and the target GPU satisfying the second preset condition in the target controlled host includes:

screening out, by use of GPU information of the GPU in the dispatchable controlled host and virtual GPU information in all pods in the dispatchable controlled host, the target controlled host satisfying the first preset condition in the dispatchable controlled host and the target GPU satisfying the second preset condition in the target controlled host.

In some embodiments, a process of screening out the target controlled host satisfying the first preset condition in the dispatchable controlled host and the target GPU satisfying the second preset condition in the target controlled host includes:

screening out the target controlled host with most idle GPU resources from the dispatchable controlled host and the target GPU with a largest frame buffer in the target controlled host.

In some embodiments, a process of allocating the pod to be allocated to the target controlled host includes:

allocating and binding the pod to be allocated to the target controlled host.

The present disclosure also discloses a GPU-shared single-machine multi-card method, applied to a target controlled host and including:

receiving a resource division request sent by a pod bound to the target controlled host;

traversing the pod bound to the target controlled host to determine whether there are a plurality of pods recording resource division information consistent with that recorded in the resource division request;

if there is only one pod recording the resource division information consistent with that recorded in the resource division request, determining the pod as a target pod;

if there are the plurality of pods recording the resource division information consistent with that recorded in the resource division request, screening out the target pod without a resource occupation marker from the pods;

writing GPU information of a target GPU written to an annotation of the target pod by a dispatcher of a central control host to an environment variable of the target pod;

registering one or more corresponding virtual display cards by use of the resource division information in the target pod, and correspondingly dividing a frame buffer of the target GPU to each virtual display card; and setting the resource occupation marker for the target pod to indicate that the target GPU recorded in the annotation of the target pod is already occupied.

The present disclosure also discloses a GPU-shared dispatching system, applied to a dispatcher of a central control host and including:

a GPU information query module, configured to query GPU information in an environment variable of a non-updated pod in each controlled host by use of resource occupation markers and update markers of pods, the non-updated pod being a pod that is already running but yet does not update the GPU information;

a GPU information updating module, configured to update the GPU information to an annotation of the non-updated pod, and add the update marker for the non-updated pod;

an unmarked pod screening module, configured to screen out a dispatchable controlled host without an unmarked pod from a plurality of controlled hosts, the unmarked pod being a pod without the update marker;

a dispatching module, configured to screen out, by use of state information of a GPU in the dispatchable controlled host, a target controlled host satisfying a first preset condition from the dispatchable controlled host and a target GPU satisfying a second preset condition in the target controlled host;

a GPU information writing module, configured to write GPU information of the target GPU to an annotation of a pod to be allocated; and a pod allocation module, configured to allocate the pod to be allocated to the target controlled host.

The present disclosure also discloses a GPU-shared single-machine multi-card system, applied to a target controlled host and including:

a division request receiving module, configured to receive a resource division request sent by a pod bound to the target controlled host;

an information consistency determination module, configured to traverse the pod bound to the target controlled host to determine whether there are a plurality of pods recording resource division information consistent with that recorded in the resource division request;

a target pod determination module, configured to, if the information consistency determination module determines that there is only one pod recording the consistent resource division information consistent with that recorded in the resource division request, determine the pod as a target pod;

a target pod screening module, configured to, if the information consistency determination module determines that there are the plurality of pods recording the consistent resource division information consistent with that recorded in the resource division request, screen out the target pod without a resource occupation marker from the plurality of pods;

an environment variable writing module, configured to write GPU information of a target GPU written to an annotation of the target pod by a dispatcher of a central control host to an environment variable of the target pod;

a display memory division module, configured to register one or more corresponding virtual display cards by use of the resource division information in the target pod, and correspondingly divide a frame buffer of the target GPU to each virtual display card; and a resource occupation marking module, configured to set the resource occupation marker for the target pod to indicate that the target GPU recorded in the annotation of the target pod is already occupied.

The present disclosure also discloses a GPU-shared dispatching device, including:

a memory, configured to store a computer program; and a processor, configured to execute the computer program to implement the GPU-shared dispatching method as described above.

The present disclosure also discloses a GPU-shared single-machine multi-card device, including:

a memory, configured to store a computer program; and a processor, configured to execute the computer program to implement the GPU-shared single-machine multi-card method as described above.

In the present disclosure, the GPU-shared dispatching method is applied to a dispatcher of a central control host, including: querying GPU information in an environment variable of a non-updated pod in each controlled host by use of resource occupation markers and update markers of pods, the non-updated pod being a pod that is already running but yet does not update GPU information; updating the GPU information to the non-updated pod, and adding an update marker for the non-updated pod; screening out a dispatchable controlled host without an unmarked pod from a plurality of controlled hosts, the unmarked pod being a pod without an update marker; screening out, by use of state information of a GPU in the dispatchable controlled host, a target controlled host satisfying a first preset condition in the dispatchable controlled host and a target GPU satisfying a second preset condition in the target controlled host; writing GPU information of the target GPU a pod to be allocated; and allocating the pod to be allocated to the target controlled host.

According to the present disclosure, a resource occupation marker and an update marker are added to a pod, the resource occupation marker is used to prove that the pod is running, and the update marker is used to indicate that resource usage information in an annotation of the pod is consistent with actual resource usage information, whereby during dispatching, a resource usage situation of each pod may be determined. The resource usage information, i.e., GPU information of an actually used GPU, in the annotation of the pod is updated before dispatching, to ensure that the GPU information in the annotation is consistent with GPU information actually recorded in an environment variable of the pod, so as to avoid dispatching failures and bugs caused by inconsistency between an actual resource usage situation and the resource usage situation in the annotation, laying a foundation for a next pod to perform multi-card division by using a plurality of GPUs. In addition, when pods to be allocated are allocated, controlled hosts with unmarked pods are avoided, avoiding errors, thereby avoiding bugs caused during allocation.

BRIEF DESCRIPTION OF THE DRAWINGS

In order to describe the technical solutions in embodiments of the present disclosure or the prior art more clearly, the drawings required to be used in descriptions about the embodiments or the prior art will be introduced briefly below. Apparently, the drawings in the description below are merely embodiments of the present disclosure. Those ordinarily skilled in the art may further obtain other drawings according to the provided drawings without creative work.

DETAILED DESCRIPTION

The technical solutions in the embodiments of the present disclosure will be described clearly and completely below in combination with the drawings in the embodiments of the present disclosure. Clearly, the described embodiments are not all but only part of embodiments of the present disclosure. All other embodiments obtained by those ordinarily skilled in the art based on the embodiments in the present disclosure without creative work shall fall within the scope of protection of the present disclosure.

Figure 1:
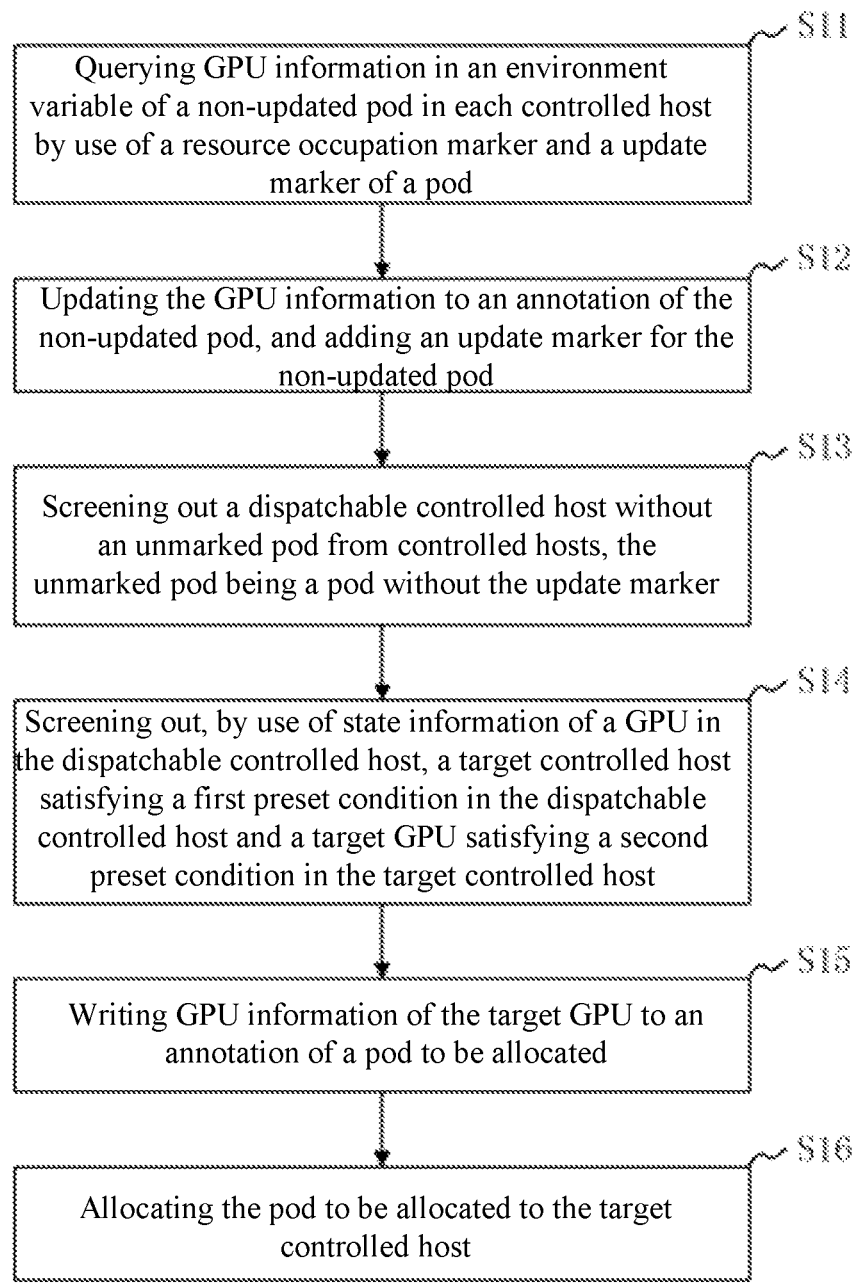
FIG. 1 is a schematic flowchart of a GPU-shared dispatching method according to some embodiments of the present disclosure.

Some embodiments of the present disclosure disclose a GPU-shared dispatching method. As shown in FIG. 1, the method is applied to a dispatcher of a central control host, and includes the following steps.

In S11, GPU information in an environment variable of a non-updated pod in each controlled host is queried by use of a resource occupation marker and a update marker of a pod.

In some embodiments, when a pod runs, a resource occupation marker may be set in its annotation to identify GPU information used when the current pod runs, so as to prove that the pod is running. Pod resources may be exchanged, namely the pod is allocated with a specified resource, but actually uses another resource. In such case, a pod resource usage situation recorded in the annotation of the pod is inconsistent with the resource actually used by the pod. Since the annotation of the pod is convenient to access, the dispatcher may perform dispatching by use of information in the annotation of the pod. If the pod resource usage situation recorded in the annotation of the pod is inconsistent with the resource actually used by the pod, there may be interference to a dispatching function of the dispatcher, resulting in a dispatching failure. Therefore, an update marker is set in the pod. The update marker is added to the pod after resource information of the pod is updated to indicate that an actual resource situation of the pod is consistent with that recorded in the annotation.

In some embodiments, a non-updated pod that is already running but yet does not update GPU information, i.e., a pod without an update marker, in each controlled host is queried first by use of resource occupation makers and update markers of pods before dispatching. Such a pod may be a pod that runs in last dispatching and is yet not updated, and thus has no update marker. Alternatively, such a pod fails to be updated due to the interruption of communication with the controlled host during updating. Therefore, for updating the non-updated pod, it is necessary to screen out a pod that is already running first by use of the resource occupation makers, then screen out the non-updated pod that is running but has no update marker by use of the update makers, and then search for a container ID of the non-updated pod.

In some embodiments, after the non-updated pod is found, the non-updated pod in the controlled host is accessed, and GPU information of a currently used GPU recorded in an environment variable of the non-updated pod is queried, so as to determine the GPU actually used by the current non-updated pod. The GPU information may be a UUID of the GPU, or related information of the GPU, such as a total display memory of the GPU.

In S12, the GPU information is updated to an annotation of the non-updated pod, and an update marker is added for the non-updated pod.

In some embodiments, markers, GPU information, and other information may be recorded in an annotation of the pod, such that the dispatcher determines information of the pod directly from the annotation of the pod without accessing the pod from the bottom by use of an ID. Therefore, after the markers and the information are recorded in the annotation of the pod, the dispatcher may acquire the information recorded in the annotation of the pod easily.

In some embodiments, GPU information of an allocated target GPU pre-written during allocation of the dispatcher is recorded in the annotation of the pod. Therefore, the GPU recorded in the annotation may be inconsistent with an actually used GPU.

In some embodiments, after the GPU information of the GPU is obtained, the GPU information is updated to the annotation of the non-updated pod to update a resource usage situation of the non-updated pod. After updating, the update maker continues to be added to the annotation to indicate that an actual resource usage situation of the pod is consistent with that recorded in the dispatcher.

It can be understood that, if the actually used GPU is consistent with the GPU in the annotation, updating may also be performed, and an update result remains the same as that before updating.

In S13, a dispatchable controlled host without an unmarked pod is screened out from controlled hosts, the unmarked pod being a pod without an update marker.

In some embodiments, due to a communication failure, etc., there may still be a non-updated pod after updating is performed once by S11 to S13. In order to avoid a running failure of a pod caused by a wrong pod resource, it is necessary to ensure that a dispatchable controlled host running the new pod has no unmarked pod. Therefore, it is also necessary to screen out a dispatchable controlled host without an unmarked pod from controlled hosts.

In S14, a target controlled host satisfying a first preset condition in the dispatchable controlled host and a target GPU satisfying a second preset condition in the target controlled host are screened out by use of state information of a GPU in the dispatchable controlled host.

In some embodiments, in order to select a relatively optimal dispatchable controlled host from screened-out dispatchable controlled hosts, it is also necessary to use state information of a GPU in each dispatchable controlled host. The state information of the GPU in the dispatchable controlled host may include GPU information of each GPU in the dispatchable controlled host and virtual GPU information in all pods in the dispatchable controlled host. By use of the state information of the GPU in the dispatchable controlled host, a GPU usage situation of each dispatchable controlled host may be determined, then a target controlled host satisfying a first preset condition is screened out from the dispatchable controlled hosts according to the first preset condition, and then a target GPU satisfying a second preset condition is screened out from the target controlled host according to the condition. Therefore, a pod to be allocated runs in the target controlled host by use of a resource of the target GPU.

In some embodiments, the first preset condition may be a controlled host with most idle GPU resources, namely the target controlled host with most idle GPU resources in the dispatchable controlled host and the target GPU with a largest frame buffer in the target controlled host may be screened out. The second preset condition may be a GPU with a largest frame buffer, namely the target GPU with a largest frame buffer is screened out from the target controlled host.

In S15, GPU information of the target GPU is written to an annotation of a pod to be allocated.

In some embodiments, GPU information of the target GPU is written to an annotation of a pod to be allocated, such that the pod to be allocated acquires the resource of the target GPU by use of the GPU information of the GPU recorded in the annotation when running in the target controlled host.

In S16, the pod to be allocated is allocated to the target controlled host.

In some embodiments, after the pod to be allocated is allocated to the target controlled host, the allocated pod may run in the target controlled host to perform display memory division.

It can be seen that, according to the embodiments of the present disclosure, a resource occupation marker and an update marker are added to a pod, the resource occupation marker is used to prove that the pod is running, and the update marker is used to indicate that resource usage information in an annotation of the pod is consistent with actual resource usage information, whereby during dispatching, a resource usage situation of each pod may be determined. The resource usage information, i.e., GPU information of an actually used GPU, in the annotation of the pod is updated before dispatching, to ensure that the GPU information in the annotation is consistent with GPU information actually recorded in an environment variable of the pod, so as to avoid dispatching failures and bugs caused by inconsistency between an actual resource usage situation and the resource usage situation in the annotation, laying a foundation for a next pod to perform multi-card division by using GPUs. In addition, when pods to be allocated are allocated, controlled hosts with unmarked pods are avoided, avoiding errors, thereby avoiding bugs caused during allocation.

Figure 2:
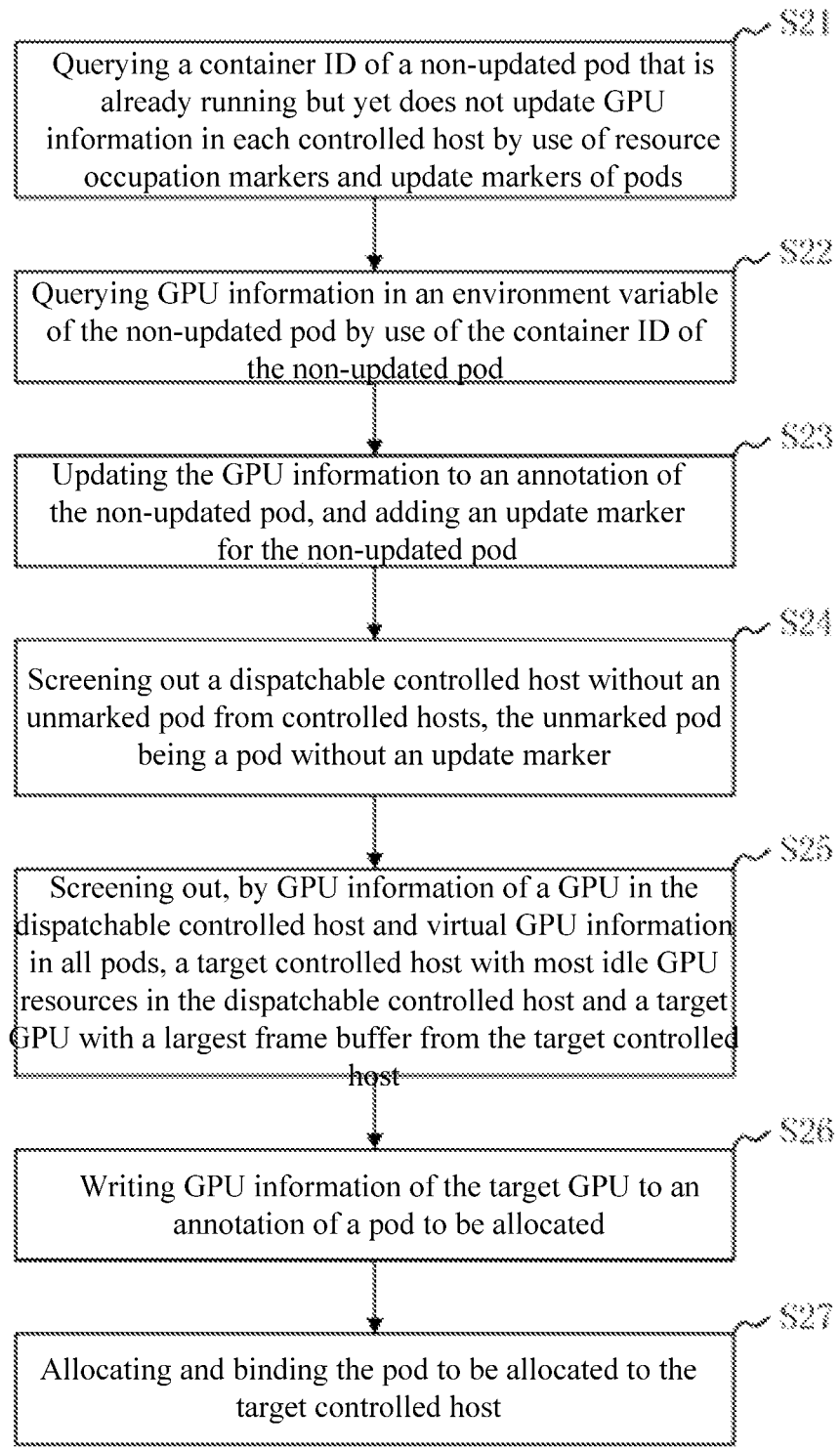
FIG. 2 is a schematic flowchart of another GPU-shared dispatching method according to some embodiments of the present disclosure.

Correspondingly, some embodiments of the present disclosure also disclose a GPU-shared dispatching method. As shown in FIG. 2, the method includes the following steps.

In S21, a container ID of a non-updated pod that is already running but yet does not update GPU information in each controlled host is queried by use of resource occupation markers and update markers of pods.

In S22, GPU information in an environment variable of the non-updated pod is queried by use of the container ID of the non-updated pod.

In some embodiments, a non-updated pod may be accessed according to a container ID of the non-updated pod by use of an Application Programming Interface (API) of docker (an open-source application container engine), so as to acquire GPU information of a GPU in an environment variable of the non-updated pod.

In S23, the GPU information is updated to an annotation of the non-updated pod, and an update marker is added for the non-updated pod.

In S24, a dispatchable controlled host without an unmarked pod is screened out from controlled hosts, the unmarked pod being a pod without an update marker.

In S25, a target controlled host with most idle GPU resources in the dispatchable controlled host and a target GPU with a largest frame buffer in the target controlled host are screened out by use of GPU information of a GPU from the dispatchable controlled host and virtual GPU information in all pods.

In some embodiments, GPUs whose display memories have been used and not used by pods may be obtained by use of GPU information of a GPU in the dispatchable controlled host and virtual GPU information in all pods in the dispatchable controlled host, so as to screen out a target controlled host with most idle GPU resources in the dispatchable controlled host and target GPU with a largest frame buffer from the target controlled host.

In S26, GPU information of the target GPU is written to an annotation of a pod to be allocated.

In S27, the pod to be allocated is allocated and bound to the target controlled host.

In some embodiments, binding the pod to the target controlled host to avoid the pod being moved or modified.

Figure 3:
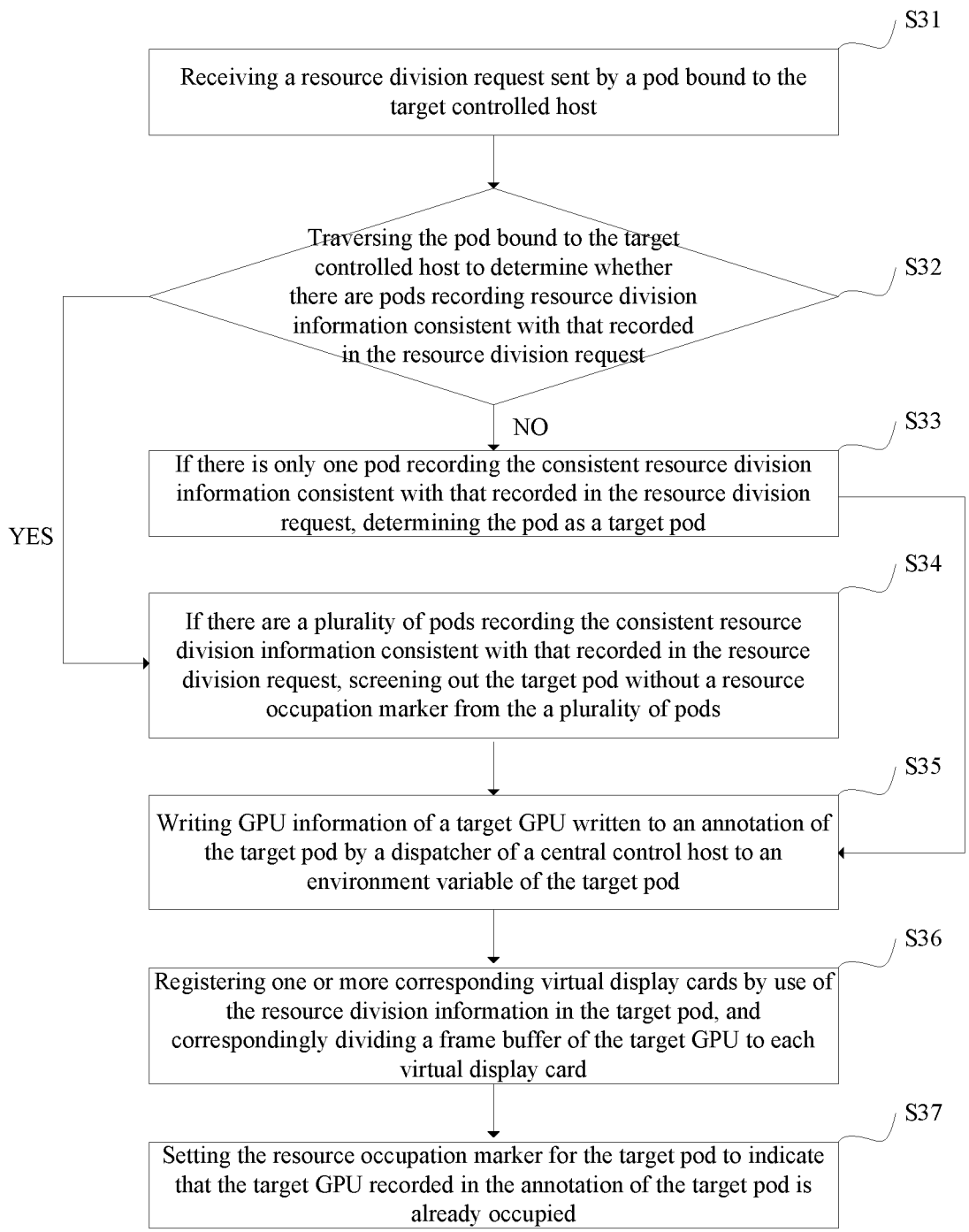
FIG. 3 is a schematic flowchart of a GPU-shared single-machine multi-card method according to some embodiments of the present disclosure.

In addition, some embodiments of the present disclosure also disclose a GPU-shared single-machine multi-card method. As shown in FIG. 3, the method is applied to a target controlled host, and includes the following steps.

In S31, a resource division request sent by a pod bound to the target controlled host is received.

In some embodiments, after being allocated to the target controlled host, a pod starts running and sends a resource division request. By use of the concept of virtual resource, virtual display cards are registered to implement single-machine multi-card display memory division. The resource division request includes resource division information. The resource division information records the number of virtual GPUs to be obtained by division and a size of a display memory of each virtual GPU. For example, resources are registered in form of inspur.com/gpu, and five resource bits are set as an ID of the virtual display card, such as 99999, to ensure that the capacity is high enough to prevent the number of virtual display cards to be registered from exceeding an upper limit. The first three of the five resource bits represent the number of virtual display cards to be registered, and the last two bits represent a display memory value to be divided for each virtual display card. For example, 00203 represents that it is necessary to obtain two virtual display cards by division, a display memory of each of which is 3 Giga Binary Byte (GiB).

In S32, the pod bound to the target controlled host is traversed to determine whether there are pods recording resource division information consistent with that recorded in the resource division request.

In some embodiments, the resource division information in the resource division request is an ID of the virtual display card, so it is necessary to determine the pod that sends the resource division request to subsequently acquire a display memory of a corresponding GPU by use of an annotation of the pod. The target controlled host may run pods recording resource division information consistent with that recorded in the resource division request, so it is necessary to select a proper pod from these pods to apply for resource division.

In S33, if there is only one pod recording the consistent resource division information consistent with that recorded in the resource division request, the pod is determined as a target pod.

It can be understood that, if there is only one pod recording the consistent resource division information consistent with that recorded in the resource division request, the pod is determined as a target pod to perform subsequent steps.

In S34, if there are pods recording the consistent resource division information consistent with that recorded in the resource division request, the target pod without a resource occupation marker is screened out from the pods.

In some embodiments, if there are pods recording the consistent resource division information consistent with that recorded in the resource division request, it is necessary to select a pod that is not running from these pods. In such case, a resource occupation marker of the pod may be used as a judgment criterion. The resource occupation marker is written to the annotation of the pod during running of the pod to indicate that a GPU recorded in the annotation of the pod is already occupied. Therefore, a pod without resource occupation marker is screened out from the pods as the target pod to perform new display memory division.

It is to be noted that, if there are pods without resource occupation markers, any one of the pods may be selected because resource division requests recorded in the pods are consistent.

In S35, GPU information of a target GPU written to an annotation of the target pod by a dispatcher of a central control host is written to an environment variable of the target pod.

In some embodiments, after the target pod is determined, GPU information of a target GPU written to an annotation of the target pod by a dispatcher of a central control host is written to an environment variable of the target pod, so as to determine the target GPU to be divided.

A UUID of the GPU may be written to the environment variable of the target pod. The target pod may specify the GPU based on the UUID of the GPU.

In S36, one or more corresponding virtual display cards are registered by use of the resource division information in the target pod, and a frame buffer of the target GPU is correspondingly divided to each virtual display card.

In some embodiments, one or more corresponding virtual display cards are registered by use of the IDs of the virtual display cards in the resource division information in the resource division request of the target pod, and a frame buffer of the target GPU is correspondingly divided to each virtual display card, so as to complete single-machine multi-card division to implement display memory divisions by a single pod on a single controlled host.

In S37, the resource occupation marker is set for the target pod to indicate that the target GPU recorded in the annotation of the target pod is already occupied.

In some embodiments, the resource occupation marker is set for the target pod to indicate that the target GPU recorded in the annotation of the target pod is already occupied, paving the way for the dispatcher to subsequently accurately dispatch the pod.

It can be seen that, according to the embodiments of the present disclosure, display memory divisions by a single pod on a single controlled host are implemented by use of the concept of registered virtual resource. After pods run, resource occupation markers are added for the pods, so a pod that does not run may be selected from pods with the same resource division request by use of the resource occupation markers, and pods with the same resource division requests are allowed to run. In addition, setting resource occupation markers paves the way for the dispatcher to subsequently accurately dispatch a pod to be allocated.

Figure 4:
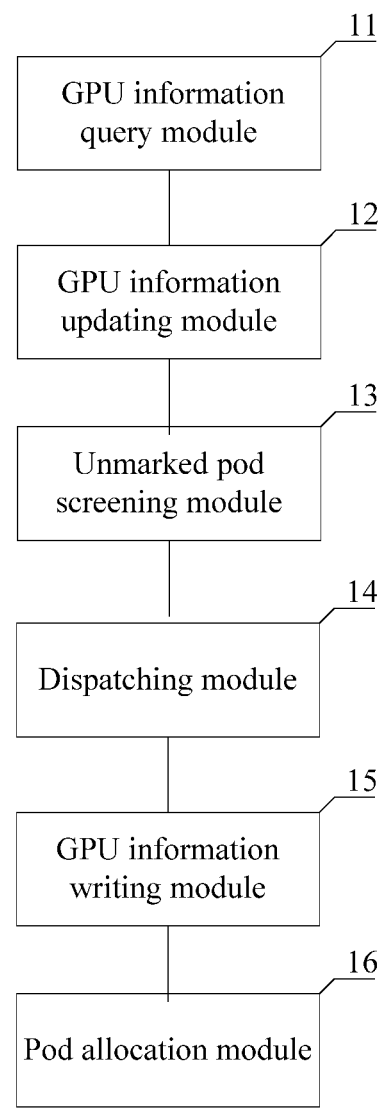
FIG. 4 is a schematic structural diagram of a GPU-shared dispatching system according to some embodiments of the present disclosure.

Correspondingly, some embodiments of the present disclosure also disclose a GPU-shared dispatching system. As shown in FIG. 4, the system is applied to a dispatcher of a central control host, and includes:

a GPU information query module 11, configured to query GPU information in an environment variable of a non-updated pod in each controlled host by use of resource occupation markers and update markers of pods, the non-updated pod being a pod that is already running but yet does not update the GPU information;

a GPU information updating module 12, configured to update the GPU information to an annotation of the non-updated pod, and add the update marker for the non-updated pod;

an unmarked pod screening module 13, configured to screen out a dispatchable controlled host without an unmarked pod from controlled hosts, the unmarked pod being a pod without the update marker;

a dispatching module 14, configured to screen out, by use of state information of a GPU in the dispatchable controlled host, a target controlled host satisfying a first preset condition from the dispatchable controlled host and a target GPU satisfying a second preset condition in the target controlled host;

a GPU information writing module 15, configured to write GPU information of the target GPU to an annotation of a pod to be allocated; and a pod allocation module 16, configured to allocate the pod to be allocated to the target controlled host.

It can be seen that, according to the embodiments of the present disclosure, a resource occupation marker and an update marker are added to a pod, the resource occupation marker is used to prove that the pod is running, and the update marker is used to indicate that resource usage information in an annotation of the pod is consistent with actual resource usage information, whereby during dispatching, a resource usage situation of each pod may be determined. The resource usage information, i.e., GPU information of an actually used GPU, in the annotation of the pod is updated before dispatching, to ensure that the GPU information in the annotation is consistent with GPU information actually recorded in an environment variable of the pod, so as to avoid dispatching failures and bugs caused by inconsistency between an actual resource usage situation and the resource usage situation in the annotation, laying a foundation for a next pod to perform multi-card division by using GPUs. In addition, when pods to be allocated are allocated, controlled hosts with unmarked pods are avoided, avoiding errors, thereby avoiding bugs caused during allocation.

In some embodiments, the GPU information query module 11 may include an update query unit and a GPU information query unit.

The update query unit is configured to query a container ID of the non-updated pod in each controlled host by use of the resource occupation markers and update markers of the pods.

The GPU information query unit is configured to query the GPU information in the environment variable of the non-updated pod by use of the container ID of the non-updated pod.

In some embodiments, the dispatching module 14 may be configured to screen out, by use of GPU information of the GPU in the dispatchable controlled host and virtual GPU information in all pods in the dispatchable controlled host, the target controlled host satisfying the first preset condition in the dispatchable controlled host and the target GPU satisfying the second preset condition in the target controlled host.

Further, the dispatching module 14 may be further configured to screen out, by use of the GPU information of the GPU in the dispatchable controlled host and the virtual GPU information in all the pods, the target controlled host with most idle GPU resources from the dispatchable controlled host and the target GPU with a largest frame buffer from the target controlled host.

In some embodiments, the pod allocation module 16 may be configured to allocate and bind the pod to be allocated to the target controlled host.

In some embodiments, the non-updated pod may be accessed according to the container ID of the non-updated pod by use of an API of docker, so as to acquire the GPU information of the GPU in the environment variable of the non-updated pod.

Figure 5:
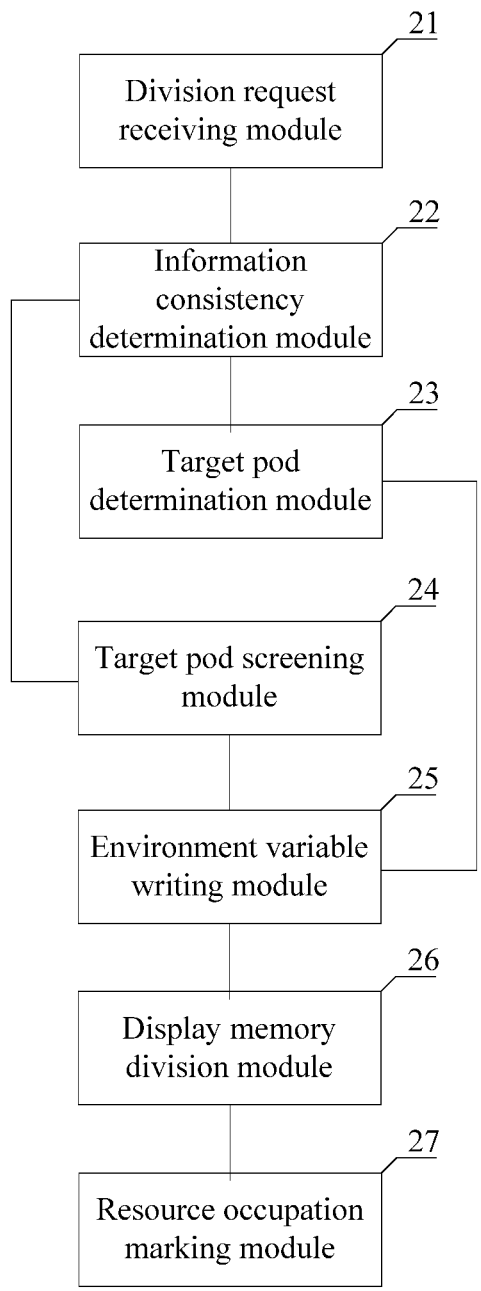
FIG. 5 is a schematic structural diagram of a GPU-shared single-machine multi-card system according to some embodiments of the present disclosure.

Correspondingly, some embodiments of the present disclosure also disclose a GPU-shared single-machine multi-card system. As shown in FIG. 5, the system is applied to a target controlled host, and includes:

a division request receiving module 21, configured to receive a resource division request sent by a pod bound to the target controlled host;

an information consistency determination module 22, configured to traverse the pod bound to the target controlled host to determine whether there are pods recording resource division information consistent with that recorded in the resource division request;

a target pod determination module 23, configured to, if the information consistency determination module 22 determines that there is only one pod recording the consistent resource division information consistent with that recorded in the resource division request, determine the pod as a target pod;

a target pod screening module 24, configured to, if the information consistency determination module 22 determines that there are pods recording the consistent resource division information consistent with that recorded in the resource division request, screen out the target pod without a resource occupation marker from the pods;

an environment variable writing module 25, configured to write GPU information of a target GPU written to an annotation of the target pod by a dispatcher of a central control host to an environment variable of the target pod;

a display memory division module 26, configured to register one or more corresponding virtual display cards by use of the resource division information in the target pod, and correspondingly divide a frame buffer of the target GPU to each virtual display card; and a resource occupation marking module 27, configured to set the resource occupation marker for the target pod to indicate that the target GPU recorded in the annotation of the target pod is already occupied.

It can be seen that, according to the embodiments of the present disclosure, display memory divisions by a single pod on a single controlled host are implemented by use of the concept of registered virtual resource. After pods run, resource occupation markers are added for the pods, so a pod that does not run may be selected from pods with the same resource division request by use of the resource occupation markers, and pods with the same resource division requests are allowed to run. In addition, setting resource occupation markers paves the way for the dispatcher to subsequently accurately dispatch a pod to be allocated.

Figure 6:
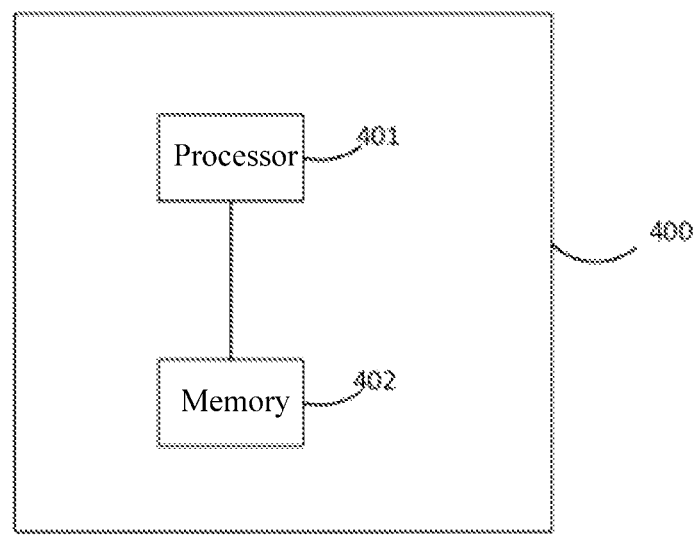
FIG. 6 is a schematic diagram of a GPU-shared dispatching device according to some embodiments of the present disclosure.

In addition, some embodiments of the present disclosure also disclose a GPU-shared dispatching device 400, which, as shown in FIG. 6, includes:

a memory 402, configured to store a computer program; and a processor 401, configured to execute the computer program to implement the GPU-shared dispatching method as described above.

Figure 7:
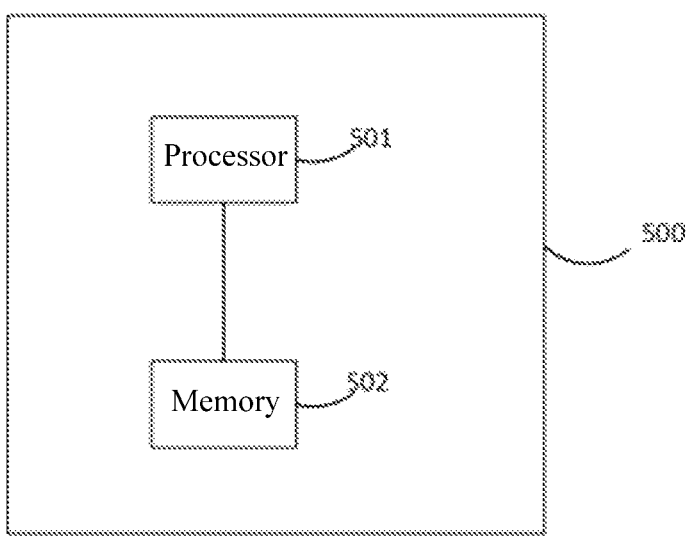
FIG. 7 is a schematic diagram of a GPU-shared single-machine multi-card device according to some embodiments of the present disclosure.

In addition, some embodiments of the present disclosure also disclose a GPU-shared single-machine multi-card device 500, which, as shown in FIG. 7, includes:

a memory 502, configured to store a computer program; and a processor 501, configured to execute the computer program to implement the GPU-shared single-machine multi-card method as described above.

It is finally to be noted that relational terms herein, such as first and second, are only for distinguishing one entity or operation from another and do not necessarily require or imply the existence of any practical relation or sequence between these entities or operations. Moreover, terms "include" and "contain" or any other variation thereof is intended to cover nonexclusive inclusions, whereby a process, method, object, or device including a series of elements not only includes those elements but also includes other elements that are not clearly listed, or further includes elements intrinsic to the process, the method, the object, or the device. With no more restrictions, an element defined by statement "including a/an . . . " does not exclude the existence of the same other elements in a process, method, object, or device including the element.

Professionals may further realize that the units and algorithm steps of each example described in combination with the embodiments disclosed herein may be implemented by electronic hardware, computer software, or a combination thereof. For clarity of description about the interchangeability of hardware and software, the compositions and steps of each example have been described generally in the foregoing descriptions according to functions. Whether these functions are executed by hardware or software depends on applications and design constraints of the technical solutions. Professionals may realize the described functions for each application by use of different methods, but such realization shall fall within the scope of the present disclosure.

The technical contents provided in the present disclosure are introduced above in detail. The principle and implementation modes of the present disclosure are described herein with examples. The above descriptions about the embodiments are only for helping in understanding the method of the present disclosure and the core concept thereof. In addition, those ordinarily skilled in the art may make variations to the implementation modes and the application scope according to the concept of the present disclosure. In summary, the contents of the specification should not be understood as limits to the present disclosure.

The invention claimed is:

1. A Graphics Processing Unit (GPU)-shared dispatching method, being applied to a dispatcher of a central control host and comprising:

in response to a determination that a current pod runs, setting a resource occupation marker in annotation of the current pod to identify first GPU information used during the current pod running through the resource occupation marker;

in response to a determination that the first GPU information of the current pod is updated, setting an update marker for the current pod;

querying the first GPU information in an environment variable of a non-updated pod in each of a plurality of controlled hosts by use of the resource occupation marker and the update marker of a pod, the non-updated pod being a pod that is already running but yet does not update the first GPU information;

updating the first GPU information to an annotation of the non-updated pod, and adding the update marker for the non-updated pod;

screening out a dispatchable controlled host without an unmarked pod from the plurality of controlled hosts, the unmarked pod being a pod without the update marker;

screening out, by use of state information of a GPU in the dispatchable controlled host, a target controlled host satisfying a first preset condition from the dispatchable controlled host and a target GPU satisfying a second preset condition in the target controlled host;

writing second GPU information of the target GPU to an annotation of a pod to be allocated; and allocating the pod to be allocated to the target controlled host.

2. The GPU-shared dispatching method according to claim 1, wherein the querying the first GPU information in the environment variable of the non-updated pod in each of the plurality of controlled hosts by use of the resource occupation marker and the update marker of the pod comprises:

querying a container Identity (ID) of the non-updated pod in each of the plurality of controlled hosts by use of the resource occupation marker and the update marker of the pod; and querying the first GPU information in the environment variable of the non-updated pod by use of the container ID of the non-updated pod.

3. The GPU-shared dispatching method according to claim 1, wherein the screening out, by use of the state information of the GPU in the dispatchable controlled host, the target controlled host satisfying the first preset condition from the dispatchable controlled host and the target GPU satisfying the second preset condition in the target controlled host comprises:

screening out, by use of third GPU information of the GPU in the dispatchable controlled host and virtual GPU information in all pods in the dispatchable controlled host, the target controlled host satisfying the first preset condition in the dispatchable controlled host and the target GPU satisfying the second preset condition in the target controlled host.

4. The GPU-shared dispatching method according to claim 1, wherein the screening out the target controlled host satisfying the first preset condition in the dispatchable controlled host and the target GPU satisfying the second preset condition in the target controlled host comprises:

screening out the target controlled host with most idle GPU resources from the dispatchable controlled host and the target GPU with a largest frame buffer from the target controlled host.

5. The GPU-shared dispatching method according to claim 1, wherein the allocating the pod to be allocated to the target controlled host comprises:

allocating and binding the pod to be allocated to the target controlled host.

6. A Graphics Processing Unit (GPU)-shared single-machine multi-card method, being applied to a target controlled host and comprising:

in response to a determination that a current pod runs, setting a resource occupation marker in annotation of the current pod to identify GPU information used during the current pod running through the resource occupation marker;

receiving a resource division request sent by at least one of a plurality of pods bound to the target controlled host;

traversing the plurality of pods bound to the target controlled host to determine whether there are a plurality of preset pods recording first resource division information consistent with second resource division information recorded in the resource division request;

in response to a determination that there is only one of the plurality of preset pods recording the first resource division information consistent with the second resource division information recorded in the resource division request, determining the one of the plurality of preset pods as a target pod;

in response to a determination that there are the plurality of preset pods recording the first resource division information consistent with the second resource division information recorded in the resource division request, screening out the target pod without the resource occupation marker from the plurality of preset pods;

writing GPU information of a target GPU, written to an annotation of the target pod by a dispatcher of a central control host, to an environment variable of the target pod;

registering one or more corresponding virtual display cards by use of resource division information in the target pod, and correspondingly dividing a frame buffer of the target GPU to each of the one or more corresponding virtual display card; and setting the resource occupation marker for the target pod to indicate that the target GPU recorded in the annotation of the target pod is already occupied.

7. A Graphics Processing Unit (GPU)-shared dispatching device, comprising:

a memory, configured to store a computer program; and a processor, configured to execute the computer program to:

in response to a determination that a current pod runs, set a resource occupation marker in annotation of the current pod to identify first GPU information used during the current pod running through the resource occupation marker;

in response to a determination that the first GPU information of the current pod is updated, set an update marker for the current pod;

query first GPU information in an environment variable of a non-updated pod in each of a plurality of controlled hosts by use of the resource occupation marker and the update marker of a pod, the non-updated pod being a pod that is already running but yet does not update the first GPU information;

update the first GPU information to an annotation of the non-updated pod, and add the update marker for the non-updated pod;

screen out a dispatchable controlled host without an unmarked pod from the plurality of controlled hosts, the unmarked pod being a pod without the update marker;

screen out, by use of state information of a GPU in the dispatchable controlled host, a target controlled host satisfying a first preset condition from the dispatchable controlled host and a target GPU satisfying a second preset condition in the target controlled host;

write second GPU information of the target GPU to an annotation of a pod to be allocated; and allocate the pod to be allocated to the target controlled host.

8. A Graphics Processing Unit (GPU)-shared single-machine multi-card device, comprising:

a memory, configured to store a computer program; and a processor, configured to execute the computer program to:

in response to a determination that a current pod runs, set a resource occupation marker in annotation of the current pod to identify GPU information used during the current pod running through the resource occupation marker;

receive a resource division request sent by at least one of a plurality of pods bound to the target controlled host;

traverse the plurality of pods bound to the target controlled host to determine whether there are a plurality of preset pods recording first resource division information consistent with second resource division information recorded in the resource division request;

in response to a determination that there is only one of the plurality of preset pods recording the first resource division information consistent with the second resource division information recorded in the resource division request, determine the one of the plurality of preset pods as a target pod;

in response to a determination that there are the plurality of preset pods recording the first resource division information consistent with the second resource division information recorded in the resource division request, screen out the target pod without the resource occupation marker from the plurality of preset pods;

write GPU information of a target GPU, written to an annotation of the target pod by a dispatcher of a central control host, to an environment variable of the target pod;

register one or more corresponding virtual display cards by use of resource division information in the target pod, and correspondingly divide a frame buffer of the target GPU to each of the one or more corresponding virtual display card; and set the resource occupation marker for the target pod to indicate that the target GPU recorded in the annotation of the target pod is already occupied.

9. The Graphics Processing Unit (GPU)-shared dispatching method according to claim 1, wherein the querying the first GPU information in the environment variable of the non-updated pod in each of the plurality of controlled hosts by use of the resource occupation marker and the update marker of the pod comprises:

screening out a running pod by use of the resource occupation maker; and screening the non-updated pod from the running pod by use of the update maker.

10. The Graphics Processing Unit (GPU)-shared dispatching method according to claim 1, wherein the first GPU information comprises a Universally Unique Identifier (UUID) or a total display memory.

11. The Graphics Processing Unit (GPU)-shared dispatching method according to claim 1, further comprising: after the allocating the pod to be allocated to the target controlled host, running an allocated pod in the target controlled host to perform display memory division.

12. The Graphics Processing Unit (GPU)-shared single-machine multi-card method according to claim 6, wherein the screening out the target pod without the resource occupation marker from the plurality of preset pods comprises:

determining whether there are a plurality of supposed pods without the resource occupation marker in the plurality of preset pods;

in response to a determination that there are the plurality of supposed pods without the resource occupation marker in the plurality of preset pods, screening out any one of the plurality of supposed pods to be the target pod;

in response to a determination that there are only one of supposed pods without the resource occupation marker in the plurality of preset pods, screening out the one of the plurality of supposed pods to be the target pod.

13. The Graphics Processing Unit (GPU)-shared dispatching device according to claim 7, wherein in order to query the first GPU information in the environment variable of the non-updated pod in each of the plurality of controlled hosts by use of the resource occupation marker and the update marker of the pod, the processor, upon execution of the computer program, is configured to:

query the container Identity (ID) of the non-updated pod in each of the plurality of controlled hosts by use of the resource occupation marker and the update marker of the pod; and query the first GPU information in the environment variable of the non-updated pod by use of the container ID of the non-updated pod.

14. The Graphics Processing Unit (GPU)-shared dispatching device according to claim 7, wherein in order to screen out, by use of the state information of the GPU in the dispatchable controlled host, the target controlled host satisfying the first preset condition from the dispatchable controlled host and the target GPU satisfying the second preset condition in the target controlled host, the processor, upon execution of the computer program, is configured to:

screen out, by use of third GPU information of the GPU in the dispatchable controlled host and virtual GPU information in all pods in the dispatchable controlled host, the target controlled host satisfying the first preset condition in the dispatchable controlled host and the target GPU satisfying the second preset condition in the target controlled host.

15. The Graphics Processing Unit (GPU)-shared dispatching device according to claim 7, wherein in order to screen out the target controlled host satisfying the first preset condition in the dispatchable controlled host and the target GPU satisfying the second preset condition in the target controlled host, the processor, upon execution of the computer program, is configured to:

screen out the target controlled host with most idle GPU resources from the dispatchable controlled host and the target GPU with a largest frame buffer from the target controlled host.

16. The Graphics Processing Unit (GPU)-shared dispatching device according to claim 7, wherein in order to allocate the pod to be allocated to the target controlled host, the processor, upon execution of the computer program, is configured to:

allocate and bind the pod to be allocated to the target controlled host.

17. The Graphics Processing Unit (GPU)-shared dispatching device according to claim 7, wherein in order to query the first GPU information in the environment variable of the non-updated pod in each of the plurality of controlled hosts by use of the resource occupation marker and the update marker of the pod, the processor, upon execution of the computer program, is configured to:

screen out a running pod by use of the resource occupation maker;

screen the non-updated pod from the running pod by use of the update maker.

18. The Graphics Processing Unit (GPU)-shared dispatching device according to claim 7, wherein the first GPU information comprises a Universally Unique Identifier (UUID) or a total display memory.

19. The Graphics Processing Unit (GPU)-shared dispatching device according to claim 7, wherein after allocation of the pod to be allocated to the target controlled host, the processor, upon execution of the computer program, is configured to:

run an allocated pod in the target controlled host to perform display memory division.

20. The Graphics Processing Unit (GPU)-shared single-machine multi-card device according to claim 8, wherein in order to screen out the target pod without the resource occupation marker from the plurality of preset pods, the processor, upon execution of the computer program, is configured to:

determine whether there are a plurality of supposed pods without the resource occupation marker in the plurality of preset pods;

in response to a determination that there are the plurality of supposed pods without the resource occupation marker in the plurality of preset pods, screen out any one of the plurality of supposed pods to be the target pod;

in response to a determination that there are only one of supposed pods without the resource occupation marker in the plurality of preset pods, screen out the one of the plurality of supposed pods to be the target pod.

\* \* \* \* \*